| (12) | United States Patent<br>Miura et al. | (10) Patent No.: US 8,079,638 B2<br>(45) Date of Patent: Dec. 20, 2011 |
|---|---|---|

(54) FRONT STRUCTURE OF VEHICLE

(75) Inventors: Noriyuki Miura, Fujisawa (JP); Tatsuji Ooeda, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 274 days.

(21) Appl. No.: 12/515,638

(22) PCT Filed: Nov. 27, 2007

(86) PCT No.: PCT/JP2007/072862
§ 371 (c)(1),
(2), (4) Date: May 20, 2009

(87) PCT Pub. No.: WO2008/066043
PCT Pub. Date: Jun. 5, 2008

(65) Prior Publication Data
US 2010/0314906 A1 Dec. 16, 2010

(30) Foreign Application Priority Data

Nov. 27, 2006 (JP) .................................. 2006-319323

(51) Int. Cl.
*B62D 25/08* (2006.01)
(52) U.S. Cl. ..................... 296/203.02; 293/133; 293/155
(58) Field of Classification Search ............. 296/187.09, 296/193.09, 203.01, 203.02; 293/133, 155
See application file for complete search history.

(56) References Cited

U.S. PATENT DOCUMENTS 7,210,719 B2 * 5/2007 Honda et a ..................... 293/155
7,686,358 B2 * 3/2010 Takahashi et al. ............ 293/102

FOREIGN PATENT DOCUMENTS

| JP | 10-086841 A | 4/1998 |
| JP | 2000-079884 A | 3/2000 |
| JP | 2001-106002 A | 4/2001 |

* cited by examiner

*Primary Examiner* — Dennis Pedder

(57) ABSTRACT

Provided is a front structure of a vehicle 1, and the front structure includes a pair of side members 30, a first cross member 10, a bumper 60, upper protruding-plate portions 41, lower protruding-plate portions 42, and a bracket 70. Each of the side members 30 includes an upper plate 31, a lower plate 32, and a vertical plate 33, the upper plate 31 and the lower plate 32 arranged to vertically face each other, the vertical plate 33 connecting the upper and lower plates 31 and 32. The first cross member 10 connects front-end portions 35 respectively of the side members 30. Each of the upper protruding-plate portions 41 extends frontwards integrally from the corresponding upper plate 31. Each of the lower protruding-plate portions 42 extends frontwards integrally from the corresponding lower plate 32 so as to face the corresponding upper protruding-plate portion 41. The bracket 70 includes: an upper fixation portion 71 that is fixed to the upper protruding-plate portions 41; a lower fixation portion 76 that is fixed to the lower protruding-plate portions 42; and a bumper attachment hole 75 that is used to fix the bumper 60.

1 Claim, 2 Drawing Sheets

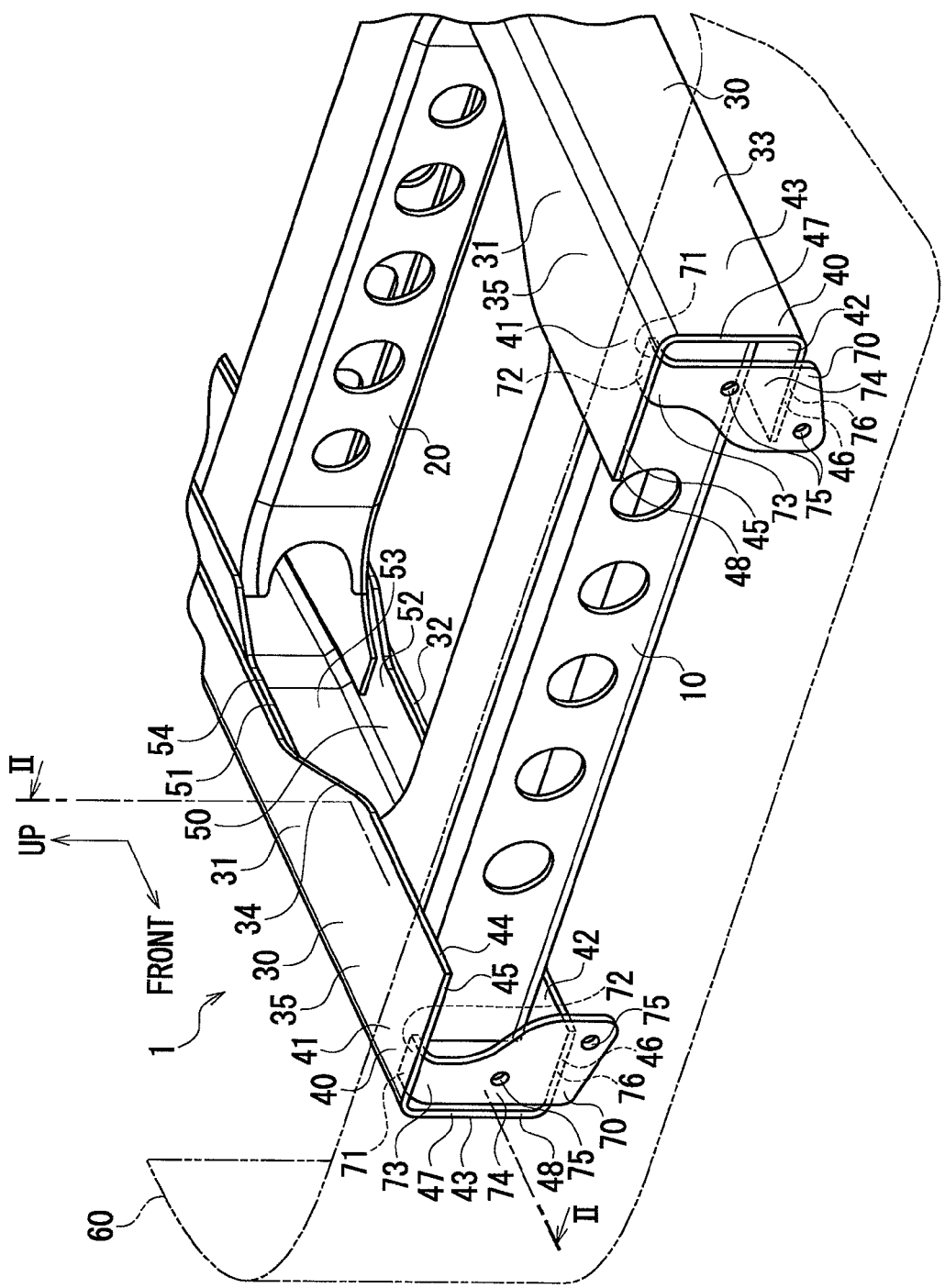

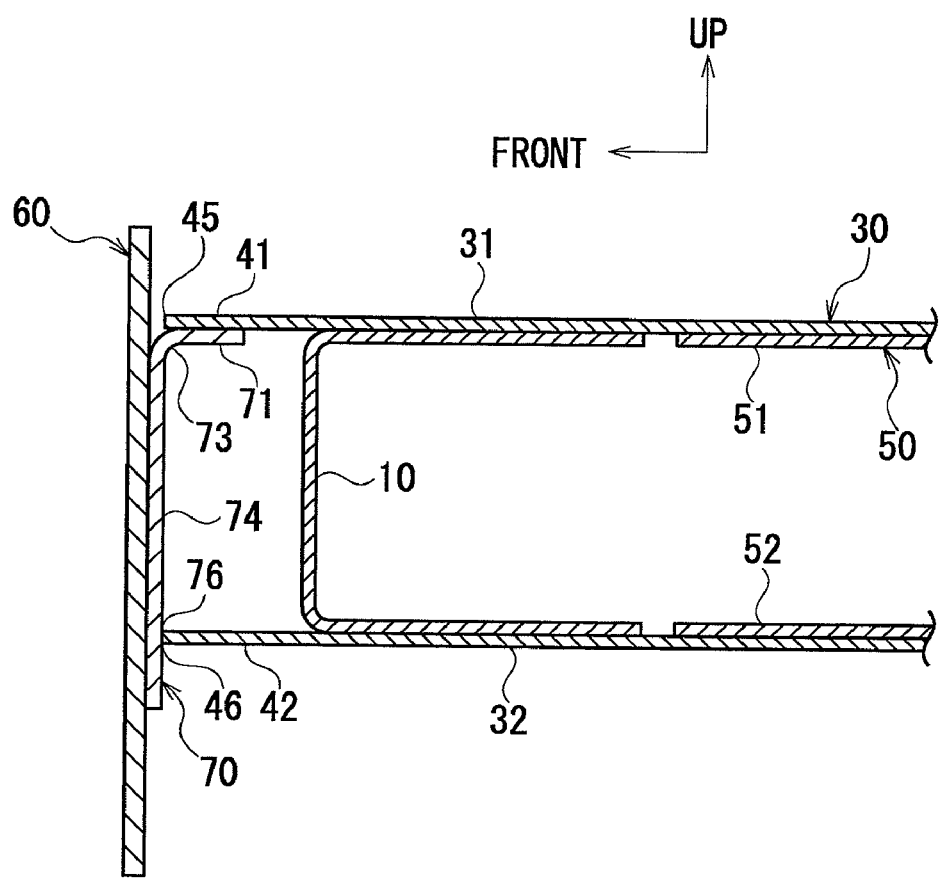

FRONT STRUCTURE OF VEHICLE

TECHNICAL FIELD

The present invention relates to a front structure of a vehicle.

BACKGROUND ART

In the event of a frontal collision of a vehicle against a rigid barrier (hereinafter referred to as a barrier), the kinetic energy is absorbed by effectively deforming a chassis frame that hits the barrier, so that a survival space can be secured and the safety of the occupants can be thus improved.

JP-A-2000-79884 discloses a structure for securing collision safety by absorbing the energy of the collision by deformation of a desired portion of a chassis frame. The structure includes a pair of side members, inner reinforcements, a first cross member, and steering brackets. Each of the side members includes a web, an upper flange, and a lower flange, and has a U-shaped cross section. The first cross member is bridged between the pair of side members at front ends of the side members. Each of the steering brackets is provided on the front-end side of the corresponding side member. A bumper cross member is fixed to the front-end sides of the steering brackets while rear-end sides of the steering brackets are connected to the first cross member.

Patent Document 1: JP-A-2000-79884

DISCLOSURE OF THE INVENTION

Problems to be Solved by the Invention

The above conventional structure includes the steering brackets which extend in the front-to-rear direction of the vehicle like the side members and which are provided respectively at the front ends of the side members. Such a structure thus causes an increase in the number of components and thus makes the assembling work complicated.

For solving the above inconveniences, it is conceivable that side members are extended frontwards from the positions thereof where a first cross member is attached with no steering brackets provided thereto.

The frontward extension of each side member, however, permits upward deformation of an upper flange of each side member and downward deformation of a lower flange thereof to happen at the time of barrier collision. The flanges are thus deformed to be separated from each other so that the side members cannot deform in a desired mode. Therefore, the energy of the collision may not be absorbed sufficiently. Such inconvenience is evitable if the bumper cross member is formed with a larger vertical width and is fixed to the upper and the lower flanges of the side members. Nevertheless, such measure also results in a larger-sized bumper cross member and an increase in weight.

The present invention is made in view of the above-described circumstances. An object of the present invention therefore is to provide a front structure of a vehicle capable of reliably deforming front portions of side members in a desired mode in the event of a frontal collision of the vehicle so as to efficiently absorb the energy, without causing an increase in the number of components and an increase in weight.

Means for Solving the Problems

To achieve the above-mentioned object, the present invention provides a front structure of a vehicle that includes a pair of side members, a cross member, a bumper, upper protruding-plate portions, lower protruding-plate portions, and a bracket.

The pair of side members are located respectively on both sides of the vehicle in a vehicle-width direction and extend in a front-to-rear direction. Each side member has a substantially U-shaped cross section and includes an upper plate, a lower plate, and a vertical plate, the upper plate and the lower plate arranged to vertically face each other, the vertical plate connecting the upper and lower plates. The cross member extends in the vehicle-width direction and connects front-end portions respectively of the pair of side members. The bumper is disposed along the vehicle-width direction at a front side of the cross member. Each of the upper protruding-plate portions extends frontwards beyond the cross member integrally from the upper plate of the front-end portion of the corresponding one of the side members. Each of the lower protruding-plate portions extends frontwards beyond the cross member integrally from the lower plate of the front-end portion of the corresponding one of the side members, so that the lower protruding-plate portion face the respective upper protruding-plate portions. The bracket includes an upper fixation portion that is fixed to the upper protruding-plate portions, a lower fixation portion that is fixed to the lower protruding-plate portions, and a bumper attachment portion to which the bumper is fixed.

With the above configuration, deformation of the upper protruding-plate portions and the lower protruding-plate portions extending integrally from the side members takes place in the event of a frontal collision of the vehicle, and thus absorbs the energy of the collision partially but efficiently. Accordingly, the amount of deformation of the side members can be reduced.

In addition, the upper fixation portion of the bracket is fixed to the upper protruding-plate portions each of which extends integrally from the corresponding side member while the lower fixation portion of the bracket is fixed to the lower protruding-plate portions each of which extends integrally from the corresponding side member. Accordingly, in the event of a frontal collision of the vehicle, there is no possibility of the opening widely of the upper and lower protruding-plate portions and of the upper and lower plates of the side members continuing from the corresponding upper and lower protruding-plate portions. For this reason, the side members can maintain their deformation strength, hence allowing the front portions of the side members to be deformed in a desired mode reliably. As a consequence, the side members can absorb the energy efficiently.

In addition, the bracket including the bumper attachment portion to which the bumper is fixed is fixed to the upper protruding-plate portions and the lower protruding-plate portions extending integrally from the corresponding side members. Accordingly, no special member is necessary for fixing the bracket to which the bumper is fixed, to the side members, so that both the increase in the number of components and the increase in weight can be avoided.

Effects of the Invention

According to the present invention, in the event of a frontal collision of a vehicle, the front portions of the side members can be deformed reliably in a desired mode, and the produced energy can be efficiently absorbed while the increase in the number of components and the increase in weight are avoided.

BRIEF DESCRIPTION OF THE DRAWINGS

FIG. 1 is a perspective view illustrating a front structure of a vehicle according to an embodiment.

FIG. 2 is a sectional view taken along and viewed as indicated by the arrowed line II-II of FIG. 1.

EXPLANATION OF REFERENCE NUMERALS 1 vehicle
10 first cross member (cross member)
20 second cross member
30 side member
31 upper plate
32 lower plate
33 vertical plate
41 upper protruding-plate portion
42 lower protruding-plate portion
60 bumper
70 bracket
71 upper fixation portion
75 bumper fixation hole (bumper attachment portion)
76 lower fixation portion

BEST MODE FOR CARRYING OUT THE INVENTION

An embodiment of the present invention will be described below with reference to the drawings.

FIG. 1 is a perspective view illustrating a front structure of a vehicle according to this embodiment. FIG. 2 is a sectional view taken along and viewed as indicated by the arrowed line II-II of FIG. 1. Note that a front-to-rear direction mentioned in the following description indicates a front-to-rear direction with respect to an advancing direction of a vehicle 1. In addition, the arrow "FRONT" in the drawings indicates a frontward direction of the vehicle while the arrow "UP" indicates an upward direction of the vehicle.

As FIGS. 1 and 2 show, the vehicle 1 of this embodiment has a front structure that includes a first cross member (cross member) 10, a second cross member 20, a pair of side members 30, protruding portions 40, reinforcement members 50, a bumper 60, and brackets 70.

The first cross member 10 has a substantially U-shaped cross section with its opening facing rearwards, and extends in the vehicle-width direction. The second cross member 20 has a closed rectangle cross section, and extends in the vehicle-width direction.

Each of the side members 30 is formed as a unitary body including an upper plate 31, a lower plate 32, and a vertical plate 33. The upper plate 31 and the lower plate 32 are arranged so as to face each other, and are connected to each other by the vertical plate 33. Each side member 30 has a substantially U-shaped cross section with an opening 34 facing inwards in a vehicle-width direction, and extends in the front-to-rear direction. Each side member 30 includes a protruding portion 40 that extends frontwards integrally from the upper plate 31, the lower plate 32, and the vertical plate 33. The pair of side members 30 are provided respectively on both sides of the vehicle in the vehicle-width direction. The pair of side members 30 have front-end portion 35, respectively, and both of the front-end portions 35 are connected to the first cross member 10. In addition, the second cross member 20 is connected to the side members 30 at portions located at rear sides of their respective front-end portions 35. The reinforcement members 50 are fixed respectively to the side members 30.

Each of the protruding portions 40 includes an upper protruding-plate portion 41, a lower protruding-plate portion 42, and a vertical protruding-plate portion 43. The upper protruding portion 41, the lower protruding-plate portion 42, and the vertical protruding-plate portion 43 extend frontwards integrally from the upper plate 31, the lower plate 32, and the vertical plate 33, respectively, in a way to make a continuous plane therebetween. Each protruding portion 40 has a substantially U-shaped cross section with an opening 44 facing inwards in the vehicle-width direction. The upper protruding-plate portion 41 extends inwards in the vehicle-width direction farther than the lower protruding-plate portion 42 does. A front-end edge 45 of the upper protruding-plate portion 41, a front-end edge 46 of the lower protruding-plate portion 42, and a front-end edge 47 of the vertical protruding-plate portion 43 are located at the same position in the front-to-rear direction, and define a front-side opening 48 having a substantially U shape. Note that each protruding portion 40 does not have to include the vertical protruding: plate portion 43 as long as the protruding portion 40 includes the upper protruding-plate portion 41 and the lower protruding-plate portion 42.

Each of the reinforcement members 50 is placed along an inner surface of the corresponding side member 30 to extend rearwards from a position located at a rear side of the connecting portion of the corresponding side member 30 and the first cross member 10. Each reinforcement member 50 is a unitary body including an upper plate 51, a lower plate 52, and a vertical plate 53. The upper plate 51 and the lower plate 52 are placed so as to face each other, and connected to each other by the vertical plate 53. Each reinforcement member 50 has a substantially U-shaped cross section with an opening 54 facing inwards in the vehicle-width direction.

The bumper 60 is placed at a front side of the side members 30 along the vehicle-width direction, and includes fixation holes (not illustrated) in rear portions thereof.

Each of the brackets 70 is a plate body provided to connect the upper protruding-plate portion 41 and the lower protruding-plate portion 42 so as to cover the corresponding front-side opening 48. Each bracket 70 includes an upper fixation portion 71, a front-side plate portion 74, two bumper attachment holes (bumper attachment portions) 75, and a lower fixation portion 76.

The upper fixation portion 71 includes a fixation face 72 and a bent portion 73. The fixation face 72 is laid on and welded to a bottom face of the upper protruding-plate portion 41 at a position located on an outer side in the vehicle-width direction. The bent portion 73 is formed by bending a portion near the front-end edge 45 of the upper protruding-plate portion 41, downwards in a substantially vertical direction.

The front-side plate portion 74 extends downwards contiguously from the bent portion 73 of the upper fixation portion 71 beyond the level of the lower protruding-plate portion 42. The outer side, in the vehicle-width direction, of the front-side plate portion 74 is opposed to the front-end edge 47 of the vertical protruding-plate portion 43 with a substantially constant gap left in between. In the front-side plate portion 74, the portion located below the level of a central portion, in the vertical direction, of the vertical protruding-plate portion 43 extends further inwards.

The two bumper attachment holes 75 are formed in the front-side plate portion 74 with one formed on an outer side in the vehicle-width direction and at a level close to that of the central portion, in the vertical direction, of the vertical protruding-plate portion 43; and the other one formed on an inner side in the vehicle-width direction and below the lower protruding-plate portion 42. The bumper attachment holes 75 are located so as to face the respective fixation holes formed in the bumper 60. The bumper attachment holes 75 are fixed to the respective fixation holes of the bumper 60 that are arranged to face the bumper attachment holes 75, by means of nuts and bolts.

The lower fixation portion 76 is a portion on the rear-side face of the front-side plate portion 74. The front-end edge 46 of each lower protruding-plate portion 42 is in contact with and welded to the rear-side face of the corresponding lower fixation portion 76.

Note that the above-described structure is not the only possible form of the brackets 70. For instance, all of the upper protruding-plate portions 41 and the lower protruding-plate portions 42 located on both sides of the vehicle in the vehicle width direction may be connected to a single bracket 70 having a shape elongated in the vehicle width direction.

According to this embodiment, in the event of a frontal collision of the vehicle 1, the energy of the collision is partially but efficiently absorbed by deformation of the upper protruding-plate portions 41 and of the lower protruding-plate portions 42 which extend integrally from the side members 30. Accordingly, the amount of deformation of the side members 30 can be reduced.

In addition, the upper fixation portion 71 and the lower fixation portion 76 of each bracket 70 are fixed respectively to the upper protruding-plate portion 41 and the lower protruding-plate portion 42 that extend integrally from the corresponding side member 30. Accordingly, in the event of an frontal collision of the vehicle 1, there is no possibility of widely opening the upper protruding-plate portions 41 and the lower protruding-plate portions 42 and of widely opening the upper plates 31 and the lower plates 32 of the side members 30 continuing respectively from the upper protruding-plate portion 41 and the lower protruding-plate portion 42. For this reason, the side members 30 can maintain their deformation strength, hence allowing the front portions of the side members 30 to be deformed in a desired mode reliably. As a consequence, the side members 30 can absorb the energy efficiently.

In addition, each of the brackets 70 in which the bumper attachment holes 75 are formed and to which the bumper 60 are fixed is fixed to the upper protruding-plate portion 41 and the lower protruding-plate portion 42 that extend integrally from the corresponding side member 30. Accordingly, no special member is necessary for fixing each bracket 70 to which the bumper 60 is fixed, to the corresponding side member 30, so that both the increase in the number of components and the increase in weight can be avoided.

INDUSTRIAL APPLICABILITY

The front structure of the present invention is suitable for various types of vehicles.

The invention claimed is:

1. A front structure of a vehicle comprising:
   a pair of side members located respectively on both sides of the vehicle in a vehicle-width direction and extending in a front-to-rear direction, each of the side members having a substantially U-shaped cross section and including an upper plate, a lower plate, and a vertical plate, the upper plate and the lower plate arranged to vertically face each other, the vertical plate connecting the upper and lower plates;
   a cross member extending in the vehicle-width direction and connecting front-end portions respectively of the pair of side members;
   a bumper disposed along the vehicle-width direction at a front side of the cross member;
   upper protruding-plate portions each of which extends frontwards beyond the cross member integrally from the upper plate of the front-end portion of the corresponding one of the side members;
   lower protruding-plate portions each of which extends frontwards beyond the cross member integrally from the lower plate of the front-end portion of the corresponding one of the side members, and which face the respective upper protruding-plate portions; and
   a bracket including an upper fixation portion that is fixed to the upper protruding-plate portions, a lower fixation portion that is fixed to the lower protruding-plate portions, and a bumper attachment portion to which the bumper is fixed,
   wherein each of the upper-protruding plate portions and each of the lower protruding-plate portions are formed as one piece with a corresponding side member.

\* \* \* \* \*